(12) United States Patent
Danielson

(10) Patent No.: US 7,793,914 B2
(45) Date of Patent: Sep. 14, 2010

(54) QUICK CONNECT CONNECTOR WITH TOLERANCE ACCOMMODATION

(75) Inventor: Robert Danielson, Ham Lake, MN (US)

(73) Assignee: Fastest, Inc., Roseville, MN (US)

( * ) Notice: Subject to any disclaimer, the term of this patent is extended or adjusted under 35 U.S.C. 154(b) by 891 days.

(21) Appl. No.: 11/671,747

(22) Filed: Feb. 6, 2007

(65) Prior Publication Data
US 2008/0185837 A1    Aug. 7, 2008

(51) Int. Cl.
*F16L 37/28* (2006.01)

(52) U.S. Cl. ............... 251/149.9; 285/86; 251/347; 251/149.6

(58) Field of Classification Search .......... 251/149.6, 251/149.8, 149.9, 151, 77, 340, 347, 321, 251/341, 149.7, 149, 149.1, 251; 285/86
See application file for complete search history.

(56) References Cited

U.S. PATENT DOCUMENTS

| | | | |
|---|---|---|---|
| 3,672,631 A * | 6/1972 | Grise ............... | 251/149.6 |
| 4,688,830 A | 8/1987 | Meisinger et al. | |
| 4,884,830 A | 12/1989 | Meisinger | |
| 4,921,282 A | 5/1990 | Meisinger | |
| 4,924,909 A | 5/1990 | Wilcox | |
| 5,343,798 A | 9/1994 | Meisinger et al. | |
| 5,507,537 A | 4/1996 | Meisinger et al. | |
| 5,609,195 A * | 3/1997 | Stricklin et al. ........ | 251/149.1 |
| 5,788,290 A | 8/1998 | Meisinger | |
| 5,816,298 A * | 10/1998 | Stricklin et al. ........ | 251/149.6 |
| 5,950,679 A | 9/1999 | Danielson et al. | |
| 6,039,303 A | 3/2000 | Danielson et al. | |
| 6,073,974 A | 6/2000 | Meisinger et al. | |
| 6,257,278 B1 | 7/2001 | Danielson et al. | |
| 6,343,630 B1 * | 2/2002 | Dubinsky ............... | 251/149.6 |
| 6,962,321 B1 * | 11/2005 | Savage et al. .......... | 251/149.6 |

FOREIGN PATENT DOCUMENTS

JP    2006-292072 A    10/2006

OTHER PUBLICATIONS

Form PCT/ISA/210, dated Jun. 26, 2008.
Form PCT/ISA/237, dated Jun. 26, 2008.

* cited by examiner

*Primary Examiner*—John K Fristoe, Jr.
*Assistant Examiner*—Andrew J Rost
(74) *Attorney, Agent, or Firm*—Hamre, Schumann, Mueller & Larson, P.C.

(57) ABSTRACT

A latching connector that connects a first fluid system to a second fluid system for performing processing operations on the second fluid system. The connector is designed to connect to a fitting on the second fluid system and accommodate dimensional tolerances in the fitting to achieve a reliable seal between the connector and the fitting and prevent fluid leakage during processing operations. The connector includes a front body, a rear body, a sleeve disposed around the front body and the rear body, a sealing piston disposed within the front body and the rear body, a shaft disposed within the sealing piston and fixed to the rear body, and a spring engaged between the sealing piston and the shaft and generating a biasing force that biases the sealing piston and the shaft in opposite directions.

23 Claims, 11 Drawing Sheets

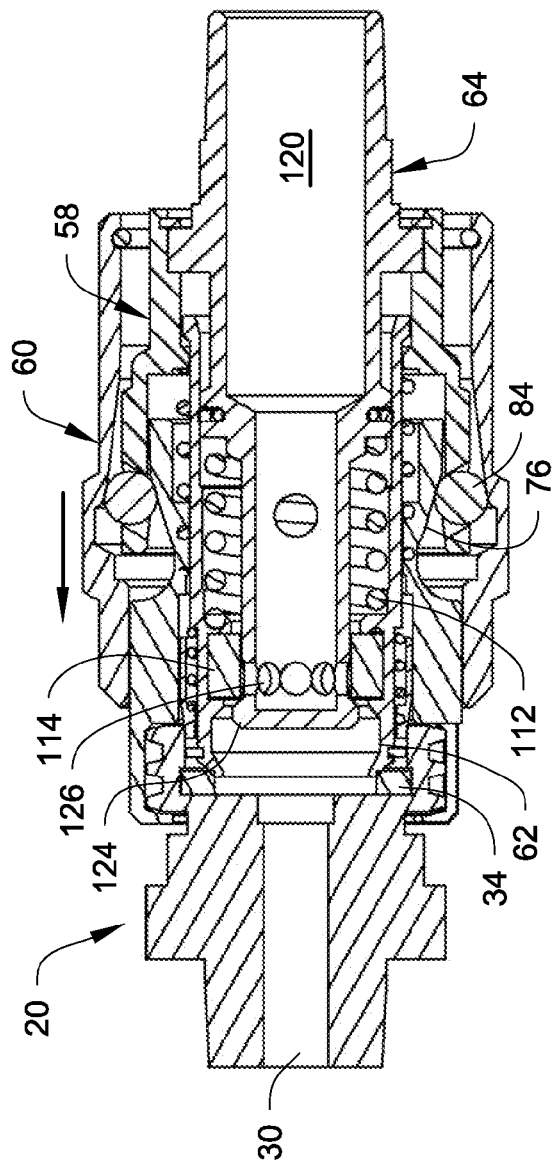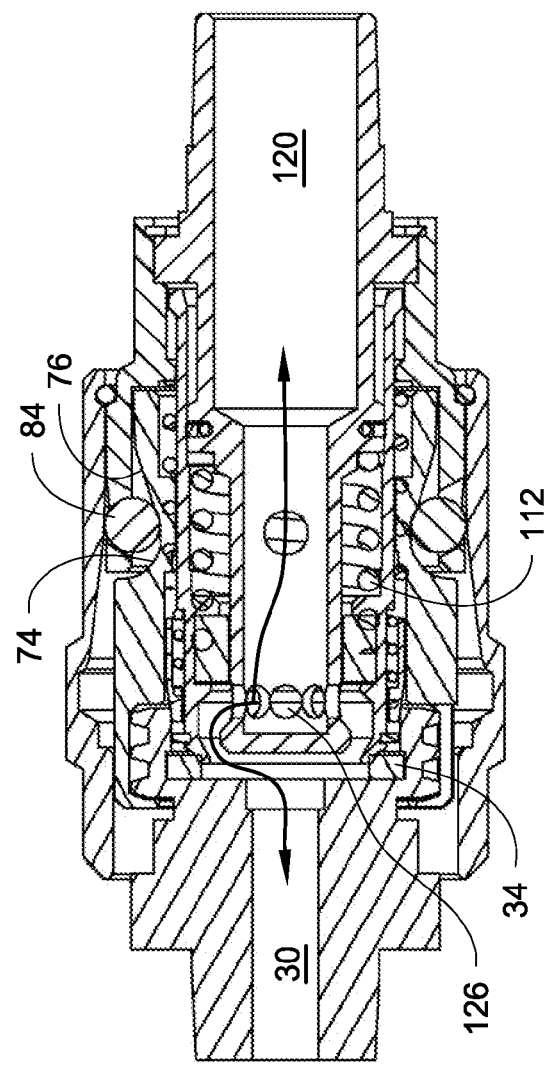
Fig. 5
Fig. 6

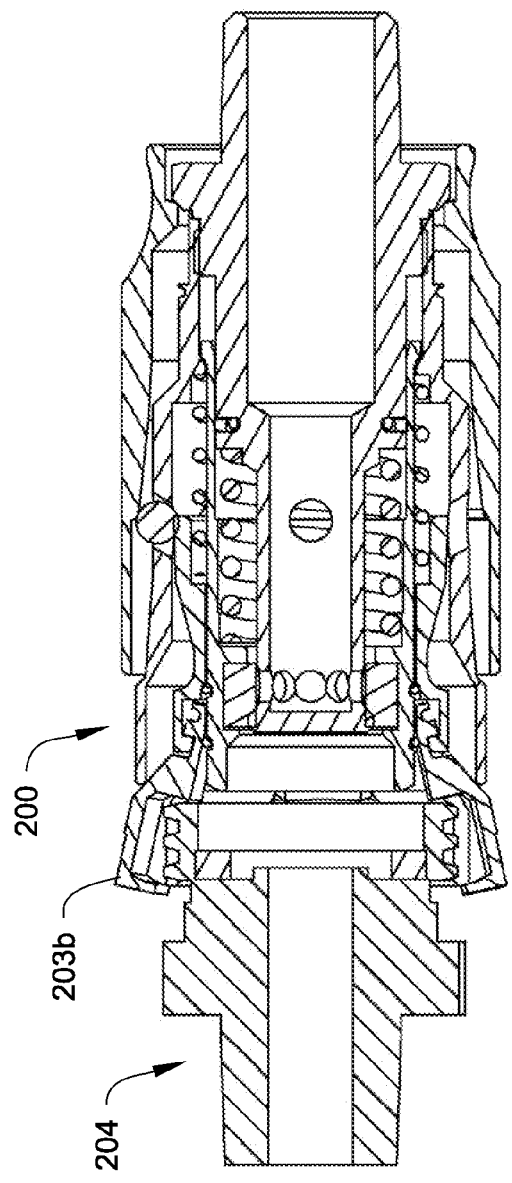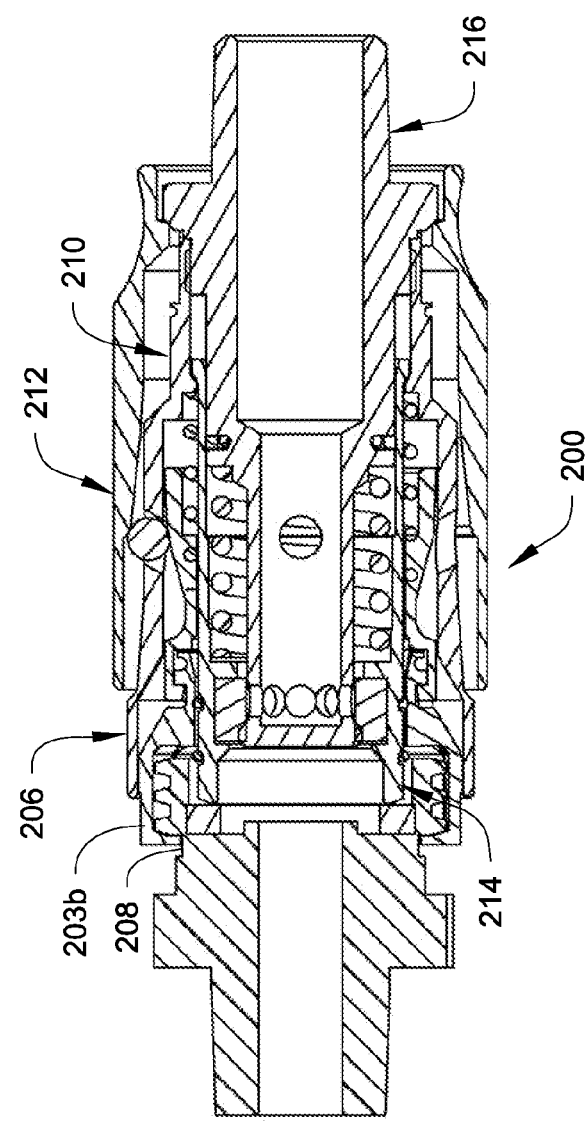
Fig. 10
Fig. 11

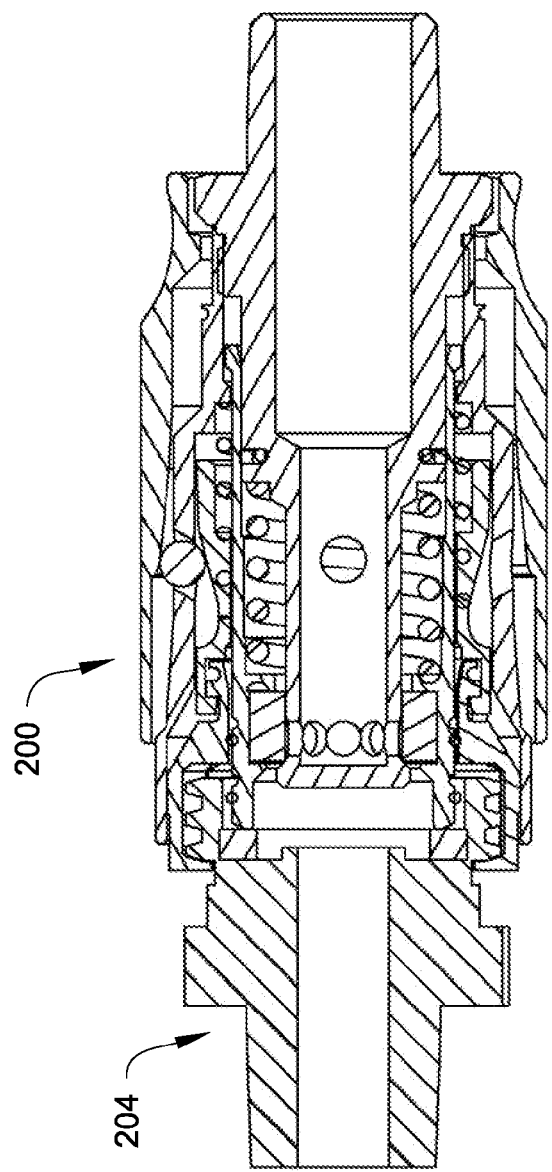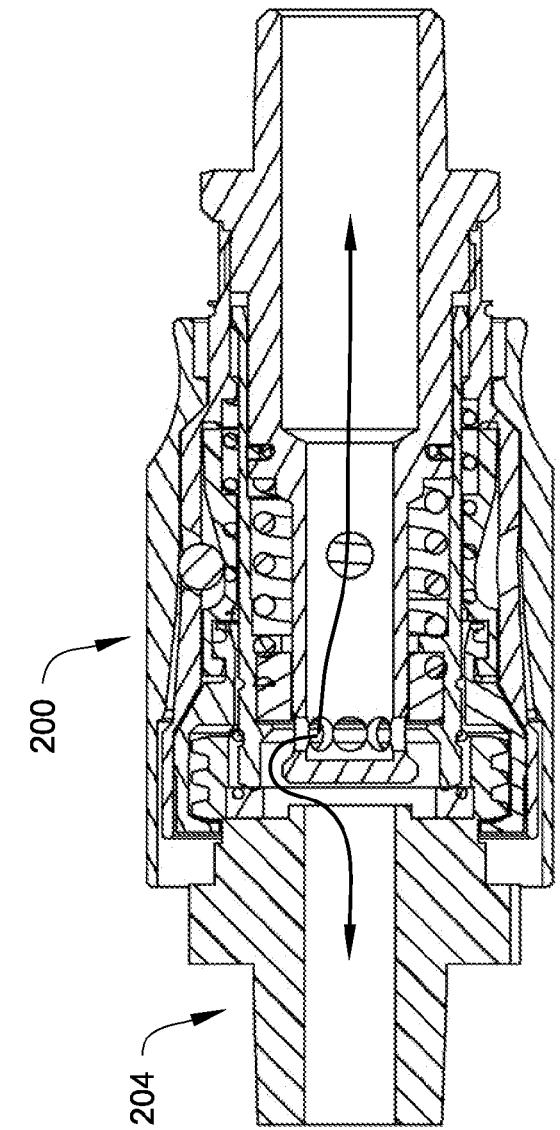
Fig. 12
Fig. 13

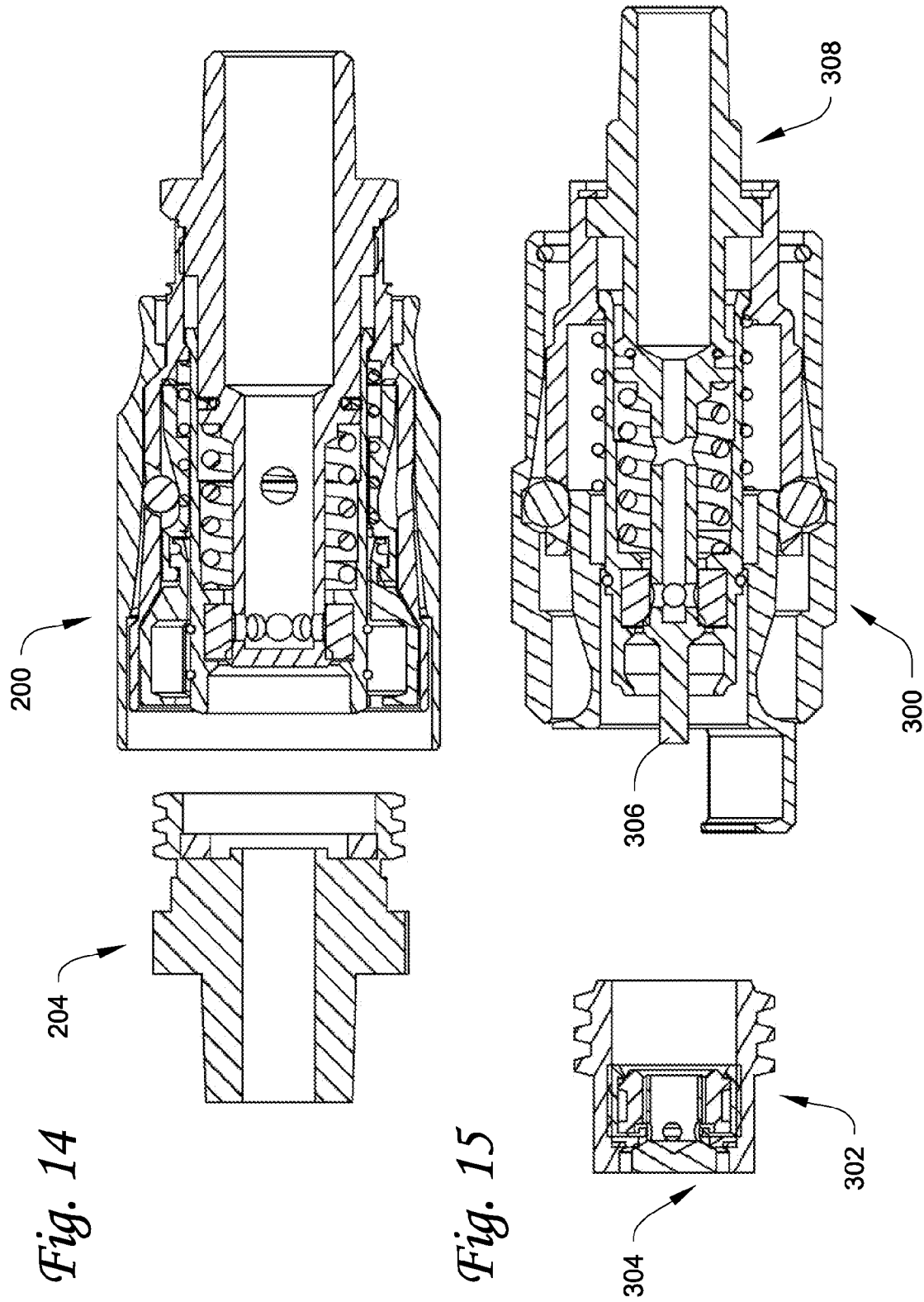

QUICK CONNECT CONNECTOR WITH TOLERANCE ACCOMMODATION

FIELD

A quick connect connector that connects a first fluid system to a second fluid system for performing processing operations, for example charging, evacuation and/or testing, on the second fluid system. In particular, a quick connect connector that is designed to accommodate the tolerance associated with a fitting of the second fluid system to which the connector is to be connected and through which a processing operation can be performed.

BACKGROUND

Quick connect connectors are often used to connect external fluid systems for example charging, evacuation and/or testing equipment, to a fluid system such as manufacturing, test, or processing equipment. Once the connection is made and any valves are opened, fluid can flow through the connector either into the fluid system or from the fluid system depending on the processing operation being performed.

Regardless of the processing operation, it is generally desirable to achieve connection of the systems and sealing of the connector prior to any fluid being allowed to flow in order to prevent fluid leakage from the connector.

The connector is typically designed to connect with a fitting on the fluid system, with the fitting including a valve that controls the flow of fluid through the fitting. The fittings generally have a common overall structure. However, differences in dimensional tolerances among fittings may cause the connector to connect differently to one fitting than to another fitting. The differences in connection can be problematic in that the connector may not seal properly with the fitting, thereby causing fluid leakage.

A connector that accommodates differences in dimensional tolerances in fittings to which the connector is to be connected, and that solves other problems in conventional connectors, is desirable.

SUMMARY

A quick connect connector that connects a first fluid system to a second fluid system for performing processing operations, for example charging, evacuation and/or testing, on the second fluid system. The first fluid system to which the connector is attached can be, for example, a source of propane for charging a propane tank, a source of low pressure for evacuating the tank, or testing equipment for testing the tank. The second fluid system can be, for example, a propane tank.

The connector is designed to connect to a fitting on the second fluid system and accommodate dimensional tolerances in the fitting to achieve a reliable seal between the connector and the fitting and prevent fluid leakage during processing operations, for example charging, evacuation or testing of the second fluid system.

The connector includes a front body, a rear body, a sleeve disposed around the front body and the rear body, a sealing piston disposed within the front body and the rear body, an anti-side load piston that surrounds the sealing piston within the front body, a shaft disposed within the sealing piston and fixed to the rear body, and a spring engaged between the sealing piston and the shaft and generating a biasing force that biases the sealing piston and the shaft in opposite directions.

The sealing piston is loaded by the spring and seals against a seal on the fitting. The spring of the sealing piston accommodates the tolerance associated with the fitting, and provides a self-adjusting seal between the sealing piston and the seal of the fitting. The force provided by the spring should be large enough to create a reliable seal between the sealing piston and the seal on the fitting. However, the large force provided by the spring makes direct actuation of the spring difficult. Therefore, the connector is provided with a mechanical advantage mechanism, for example a ball ramp mechanism, to drive the spring.

To enhance the reliability of the seal, the anti-side load piston wedges into the fitting bore to minimize side load.

The connector includes a connection mechanism configured to connect the connector with the fitting. When activated, the connector, in particular the sealing piston and the sleeve, encapsulates the end of the fitting to prevent the fitting from disconnecting from the connection mechanism. The connection mechanism can be, for example, collets or a semi-cylindrical nest.

The shaft controls flow through the connector. The shaft includes an outer wall, a flow passage defined by the wall, a sealing shoulder configured to engage with a seal on the sealing piston, and one or more openings through the outer wall leading to the flow passage. The length of the seal is greater than the length of the one or more openings to prevent the seal from being drawn into the flow stream.

The design of the connector is such that if the connector is activated without engagement with the fitting, the shaft will not actuate and will remain in sealing engagement with the seal on the sealing piston to prevent flow through the connector.

BRIEF DESCRIPTION OF THE DRAWINGS

Further details are explained below with the help of the examples illustrated in the attached drawings in which:

FIG. 5 is a longitudinal cross-sectional view of the connector and the fitting at an intermediate stage of actuation.

FIG. 6 is a longitudinal cross-sectional view of the connector and the fitting at the fully activated stage with arrows showing the fluid flow path.

FIGS. 8-14 are views similar to FIG. 1-7, respectively, showing an alternative embodiment of a connector.

FIGS. 15-19 are longitudinal cross-sectional views of another alternative embodiment of a connector at various stages of connection.

DETAILED DESCRIPTION

Figure 1:
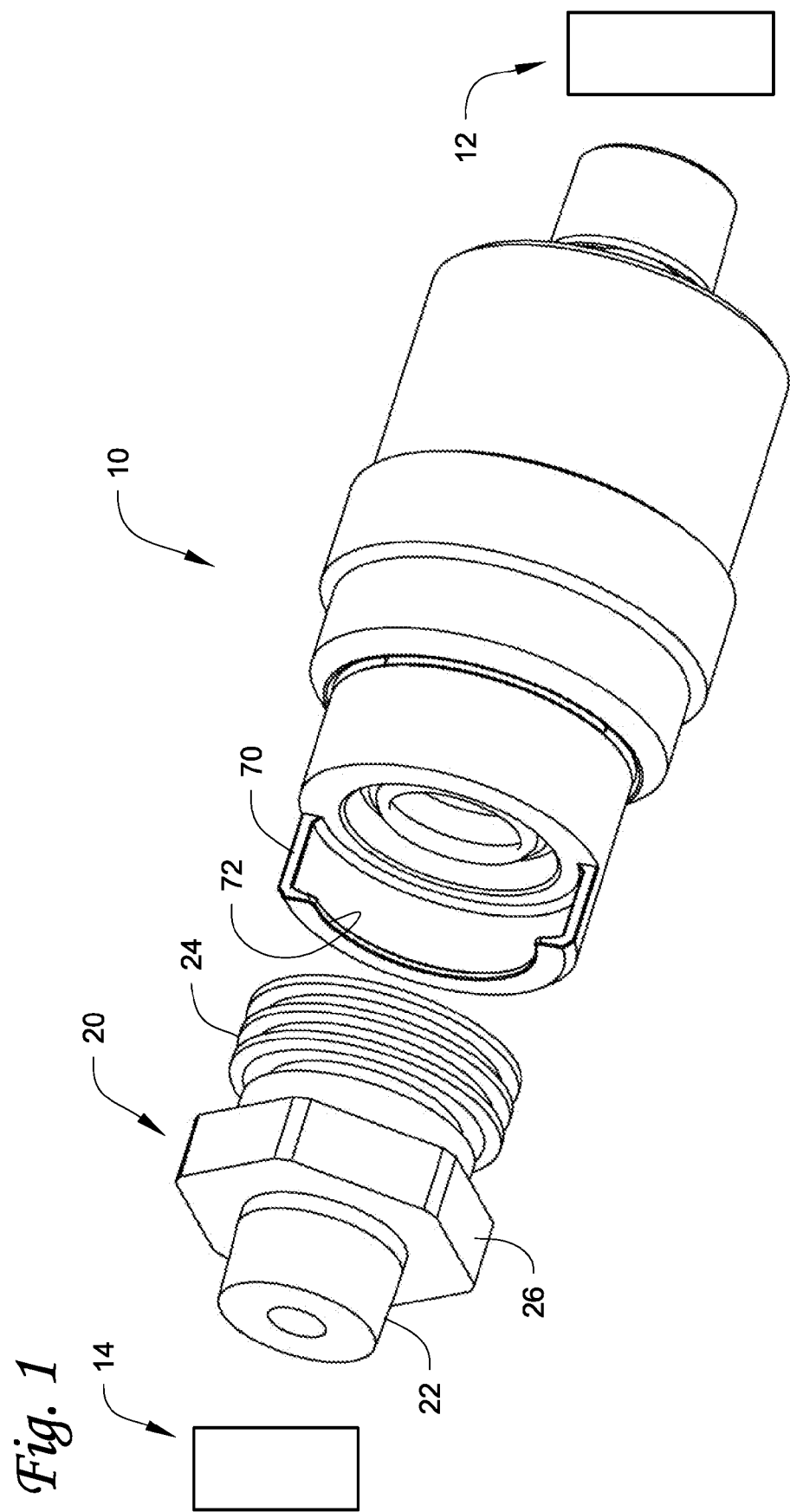
FIG. 1 is a perspective view of a connector and fitting in accordance with one exemplary embodiment.

With reference initially to FIG. 1, a quick connect connector 10 is illustrated that connects a first fluid system 12 to a second fluid system 14 for performing processing operations, for example charging, evacuation and/or testing, on the second fluid system 14. The first fluid system 12 to which the connector 10 is attached can be, for example, a source of propane for charging a propane tank, a source of low pressure for evacuating the tank, or testing equipment for testing the tank. The second fluid system 14 can be, for example, a propane tank. However, the connector 10 can be used with other fluid systems in which a quick connector is used to connect a first fluid system to a second fluid system.

The connector 10 is designed to connect to a fitting 20 of the second fluid system 14 and accommodate dimensional tolerances in the fitting 20 to achieve a reliable seal between the connector 10 and the fitting 20 and prevent fluid leakage during processing operations through the connector 10 and the fitting 20, for example charging, evacuation or testing of the fluid system 14.

Figure 2:
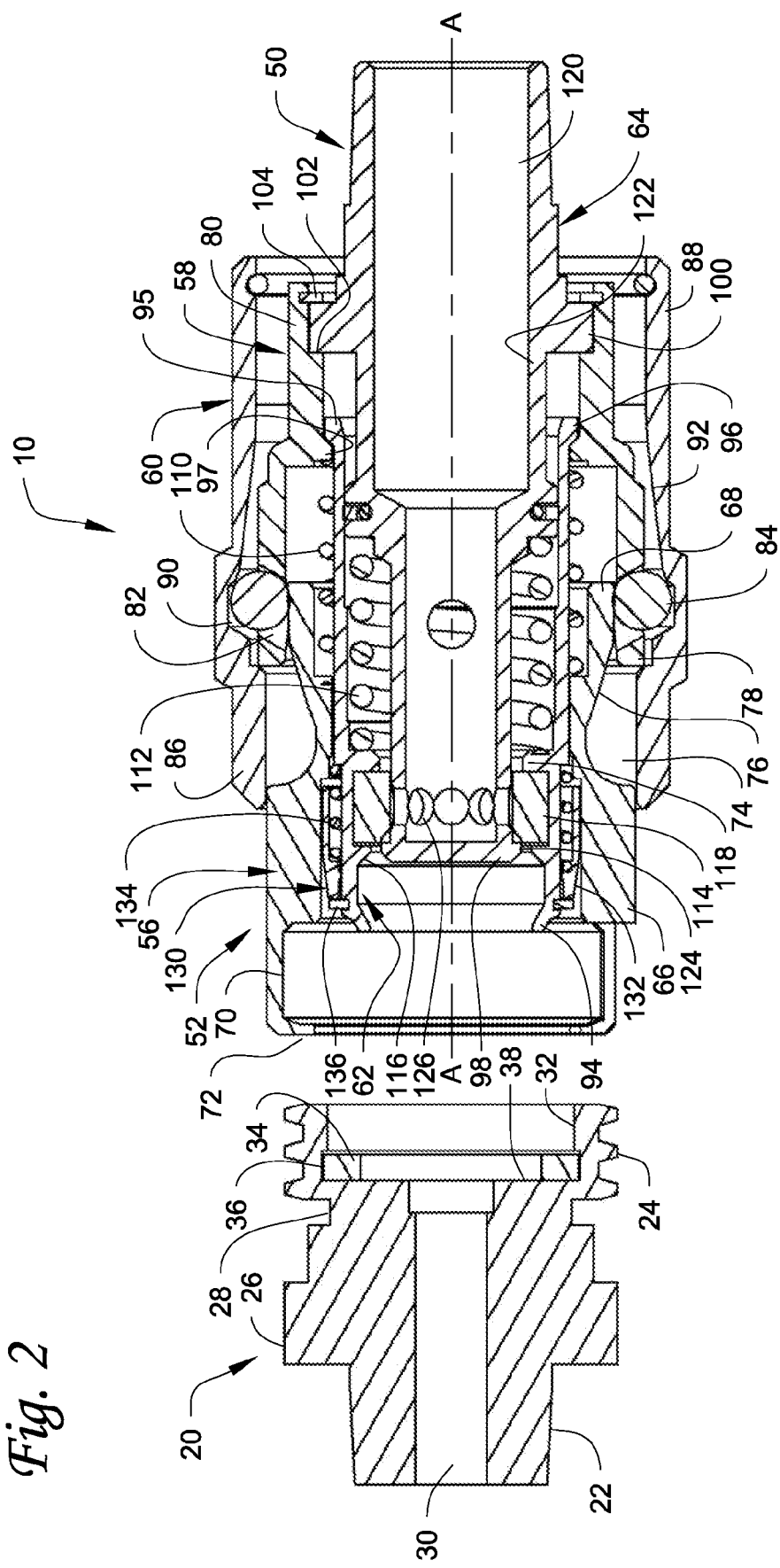
FIG. 2 is a longitudinal cross-sectional view of the connector and fitting of FIG. 1 in a default stage.

With reference to FIGS. 1 and 2, the fitting 20 includes a first end portion 22 designed to be connected to the remainder of the fluid system 14, and a second, threaded end portion 24 that connects to the connector 10. A hex surface 26 is defined between the first end portion 22 and the second end portion 24 to permit engagement with the fitting 20 by a wrench or the like. The fitting 20 further includes a circumferential channel 28 defined between the hex surface 26 and the end of the threads of the second end portion 24 which is engaged by the connector 10 during connection.

The fitting 20 further includes a fluid passage 30 extending therethrough from the first end portion 22 to the second end portion 24 to allow a fluid to flow through the fitting 20. Further, the second end portion 24 includes a bore defined by an interior surface 32. A circumferential seal 34 made of, for example, an elastomer, is disposed in a circumferential channel 36 formed in the interior surface 32 next to an interior, vertical wall 38 defining a transition from the interior surface 32 to the fluid passage 30.

A valve (an embodiment of which is illustrated in FIGS. 15-19) can be incorporated into the fitting 20 or located downstream from the fitting 20 to control fluid flow through the fluid passage 30, and prevent escape of fluid from the fluid system 14.

Turning now to the connector 10, and with continued reference to FIGS. 1 and 2, the connector 10 includes a first end portion 50 that is connected to the fluid system 12 so that the connector 10 is in fluid communication with the fluid system 12, and a second end portion 52 that is configured to detachably connect to and seal with the fitting 20. The connector 10 is generally cylindrical and includes a longitudinal axis A-A. The connector 10 also includes the following components: a front body 56 that includes the second end portion 52, a rear body 58, an actuating sleeve 60, a sealing piston 62, an anti-side load piston 130, and a shaft 64 that includes the first end portion 50.

The front body 56 includes a first end 66 and a second end 68, with the first end 66 having a connection mechanism 70 fixed thereto that is configured to connect to the fitting 20. In the embodiments, illustrated in FIGS. 1-7, the connection mechanism 70 comprises a semi-cylindrical nest that includes a flange 72 that is configured to fit into the channel 28 of the fitting as shown in FIGS. 3-6. The semi-cylindrical design of the nest allows the nest to fit over the end portion 24 of the fitting 20 when connecting the connector to the fitting, with the flange 72 then fitting into the channel 28 to engage the connector with the fitting.

The second end 68 of the front body 56 is slideably disposed within the rear body 58 whereby the front body 56 and the rear body 58 can move relative to one another in a direction parallel to the longitudinal axis. Between the first and second ends 66, 68, the front body 56 includes a cylindrical recess 74 formed in the exterior surface thereof, with a circumferential actuating ramp 76 extending from the recess 74 to the exterior surface adjacent the second end 68. The actuating ramp 76 is at an acute angle relative to the longitudinal axis, for example about 17-22 degrees. The purpose of the actuating ramp 76 will be described later.

The rear body 58 includes a first end 78 disposed around the second end 68 of the front body 56 and a second end 80. The first end 78 includes a plurality of circumferentially spaced holes 82 extending therethrough, with an actuating ball 84 disposed in each hole. The balls 84 are engageable with the actuating ramp 76 as will be described further below.

The actuating sleeve 60 includes a first end 86 and a second end 88, and is disposed around both the front body 56 and the rear body 58. In particular, the sleeve 60 includes an interior surface at the first end 86 that is slideably disposed on an exterior surface of the front body 56 adjacent the first end 66 thereof. A circumferential channel 90 is formed on the interior surface of the sleeve 60 between the first and second ends 86, 88, and an actuating surface 92 extends rearwardly from the channel 90 toward the second end 88. The actuating surface 92 is disposed at an acute angle relative to the longitudinal axis, for example about 7-20 degrees. The sleeve 60 also includes a snap ring at the second end 88 that retains the sleeve.

The balls 84, ramp 76 and surface 92 together form a mechanical advantage mechanism that provides a mechanical advantage during actuation of the connector 10 as will be described further below.

The sealing piston 62 is disposed within the front body 56 and the rear body 58, and includes a first end 94 that is configured for sealing engagement with the seal 34 of the fitting 20, and a second end 96. The sealing piston 62 is retained within the rear body 58 by engagement between a flange 95 formed at the second end 96 and a flange 97 formed on the interior surface of the rear body 58.

The shaft 64 is disposed within the sealing piston 62 and includes a first end 98 and the end portion 50. A flange 100 is defined on the exterior surface of the shaft 64 intermediate the end 98 and the end portion 50. The flange 100 is engaged with a shoulder 102 on the interior surface of the rear body 58, and a snap ring 104 is inserted into a groove formed in the interior surface of the rear body behind the flange 100. Therefore, the shaft 64 and the rear body 58 are connected to one another so as to be movable together.

As shown in FIG. 2, a coil spring 110 surrounds the sealing piston 62 and is disposed between, and acts on, the front body 56 and the rear body 58. The spring 110 biases the front body 56 and the rear body 58 in opposite directions away from each other in a direction parallel to the longitudinal axis. In addition, a coil spring 112 surrounds the shaft 64, and is disposed between, and acts on, the sealing piston 62 and the shaft 64. The coil spring 112 generates a biasing force that biases the sealing piston 62 and the shaft 64 in opposite directions in a direction parallel to the longitudinal axis.

The shaft 64 and the sealing piston 62 are configured to be in sealing engagement with each other at certain times during use of the connector 10 to control fluid flow through the connector. As illustrated in FIG. 2, a circumferential seal 114 is disposed on the interior surface of the sealing piston, held within a channel defined between a pair of flanges 116, 118 on the interior surface. In addition, the shaft 64 is generally hollow and includes a fluid flow passage 120 that extends from the end portion 50 toward the end 98 which is closed. The flow passage 120 is defined by an outer wall 122 of the shaft. The end 98 includes a sealing shoulder 124 that projects beyond the outer diameter of the outer wall 122 at the end 98 that is engageable with the seal 114. In addition, a plurality of openings 126 are formed in the wall 122 at circumferentially spaced locations adjacent the end 98 to be able to place the flow passage 120 in fluid communication with the exterior of the wall 122.

FIG. 2 illustrates that the length of the seal 114 measured in a direction parallel to the longitudinal axis is greater than the length of each opening 126 measured in a direction parallel to the longitudinal axis. This prevents the seal 114 from being drawn into the openings 126 during operation of the connector 10.

The connector 10 further includes an anti-side load piston 130 that surrounds the end 94 of the sealing piston 62 and is slideably disposed between an outer surface of the sealing piston 62 and an interior surface of the front body 56. The piston 130 includes a wedge-shaped forward end 132, and a coil spring 134 that surrounds the sealing piston 62 and acts on the piston 130 to bias the piston 130 in a direction toward the fitting 20. A snap-ring 136 fixed to the sealing piston 62 retains the piston 130 on the sealing piston 62.

Figure 3:
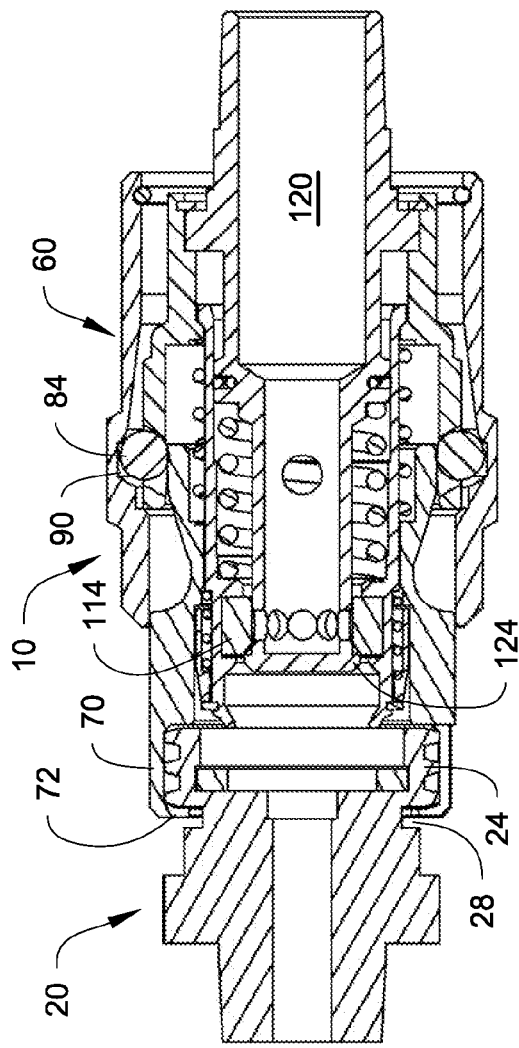
FIG. 3 is a longitudinal cross-sectional view showing the connector connected to the fitting, with the connector not activated.

The operation of the connector 10 will now be described with reference to FIGS. 2-7. FIG. 2 illustrates a default stage of the connector 10 when the connector is not connected to the fitting. FIG. 3 illustrates the connector 10 when the connection mechanism 70 is first hooked to the fitting 20, with the flange 72 disposed behind the threads of the end portion 24 in the channel 28. In this preliminary stage, the balls 84 are recessed into the channel 90 of the sleeve 60. Further, the sealing piston 62 and side load piston 130 are recessed within the front body 56 in their default location. In addition, the sealing shoulder 124 is in sealing engagement with the seal 114, thereby preventing fluid flow through the fluid passage 120.

Figure 4:
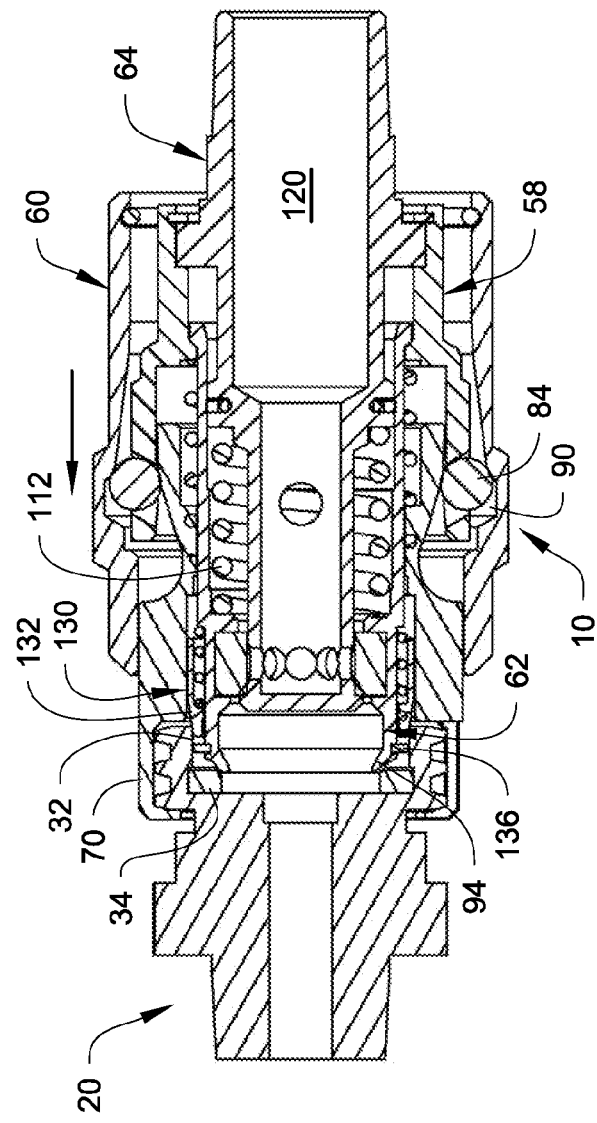
FIG. 4 is a longitudinal cross-sectional view of the connector and the fitting at the beginning of actuation.

FIG. 4 illustrates the connector 10 at the beginning of actuation to achieve connection. Connection is started by a user pushing on the sleeve 60 in a direction toward the fitting 20. This causes the balls 84 to start leaving the channel 90, and forces the rear body 58, the shaft 64, and the sealing piston 62 to move together toward the fitting 20 with the sealing piston 62 moving into the bore of the fitting. This prevents the fitting 20 from slipping out of the hooked grip of the connection mechanism 70. In addition, the end 94 of the sealing piston 62 contacts the seal 34 in the fitting 20. Further, the anti-side load piston 130 wedges into the bore of the fitting, with the wedge-shaped forward end 132 engaged with the surface 32. This limits the amount of movement to the sealing area caused by side loads. In addition, the diameter of the ring 136 on the sealing piston 62 is slightly less than the inner diameter of the surface 32 so that the ring 136 also helps positioning and control side loads. In this stage, the sealing shoulder 124 remains in sealing engagement with the seal 114, thereby preventing fluid flow through the fluid passage 120.

In FIG. 4, the balls 84 are in a position to provide a mechanical advantage for compressing the spring 112. The spring 112 is configured to provide a high bias force forcing the sealing piston 62 into engagement with the seal 34 to ensure that the engagement remains during connection. Therefore, the mechanical advantage provided by the balls 84, ramp surface 76 and surface 92 is necessary in order to overcome the biasing force of the spring 112.

FIG. 5 illustrates the connector at an intermediate stage of connection. As the sleeve 60 pushes the balls 84 further down the ramp surface 76, the sealing piston 62 stops moving due to engagement with the seal 34. The mechanical advantage provided by the balls 84 is compressing the spring 112 and also causing the rear body 58 and the shaft 64 to move forwardly toward the fitting 20. As the shaft 64 moves forward, the sealing shoulder 124 starts to disengage from the seal 114 until the openings 126 open past the seal 114 allowing fluid to flow from the passage 120 and into the flow passage 30 of the fitting. Because the openings 126 are narrower than the seal 114, the seal 114 does not draw into the process fluid.

FIG. 6 illustrates the connector at the full connected stage. The balls 84 are at the end of the ramp surface 76 in the recess 74. The openings 126 are fully open to allow fluid to flow freely from the passage 120 through the openings 126 and to the passage 30 (or from the passage 30, through the openings 126 and into the passage 120). In addition, the sleeve 60 is over the connection mechanism 70 and the fitting end 24 to eliminate the chance of the accidental disconnection. Further, the spring 112 is fully compressed, putting significant forces on the fitting via the sealing piston 62 to maintain sealing contact with the seal 34.

Figure 7:
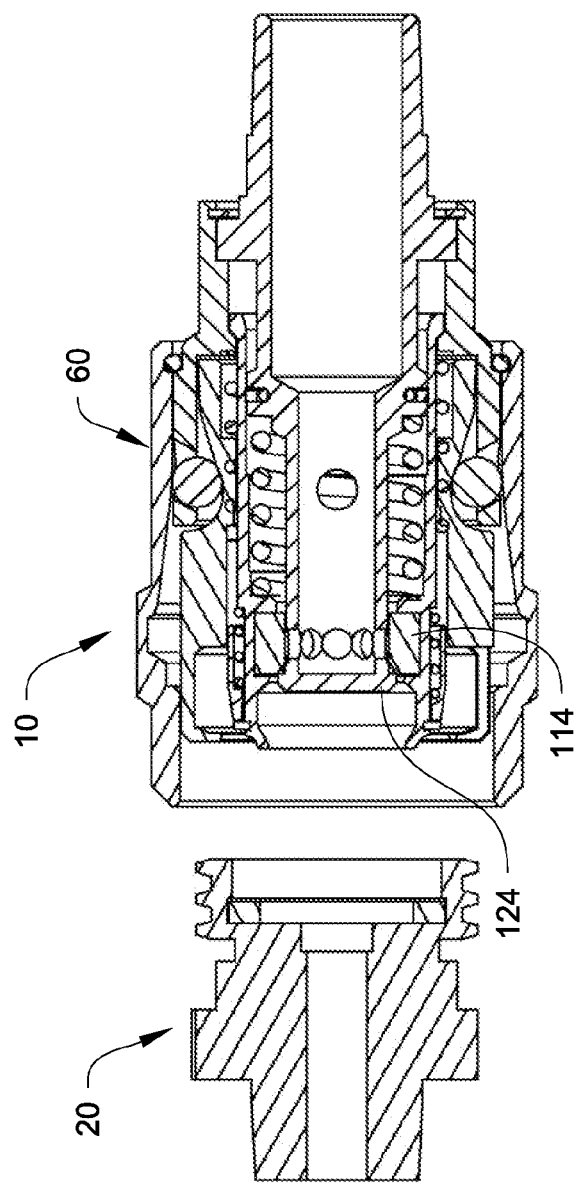
FIG. 7 is a longitudinal cross-sectional view of the connector and the fitting showing activation of the connector without engagement with the fitting.
Figure 8:
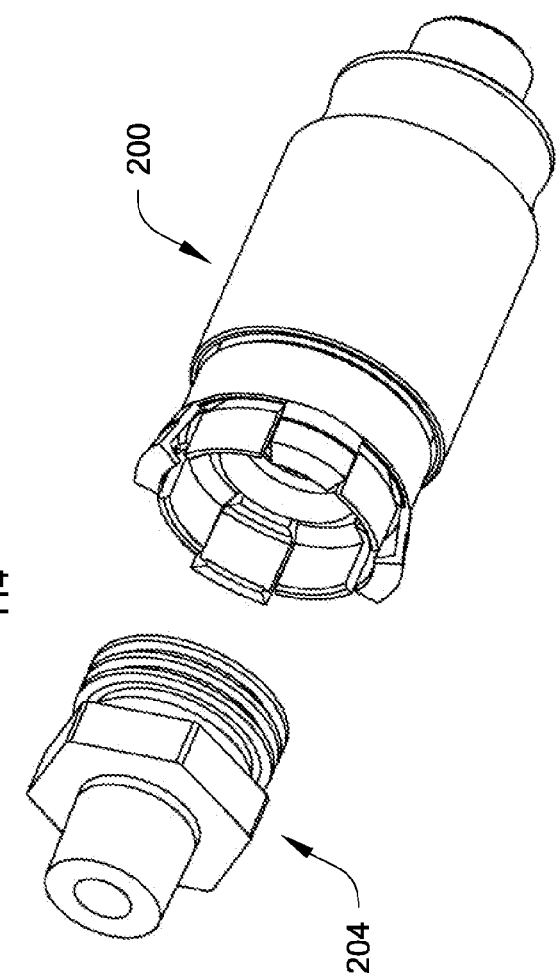

FIG. 7 illustrates operation of the connector 10 without engagement with the fitting 20. As the sleeve 60 is slid forward, the sealing shoulder 124 remains engaged with the seal 114 to prevent fluid flow through the connector.

FIGS. 8-14 illustrate an alternative embodiment of a connector 200 that incorporates many of the concepts of the connector 10. The differences in the connector 200 from the connector 10 will be described, it being understood that the undescribed features in the connector 200 are generally similar, at least in function, to corresponding features in the connector 10.

The connector 200 uses a connection mechanism 202 in the form of collets 203a, 203b to connect the connector 200 and the fitting 204. One half of the collets 203a are fixed to a front body 206 and the other half of the collets 203b are pivotably connected to the front body 206. The construction of pivoting collets and how to pivotally connect collets to a support member is well known to those of ordinary skill in the art. The fixed collets and the pivoting collets alternate with each other. The fixed collets 203a act as a guide during connection with the fitting 204 by guiding the end of the connector over the end of the fitting during connection. When connected, the pivoting collets 203b pivot down behind the threads on the end of the fitting 204 and into a circumferential channel 208, as shown in FIG. 11. Because of the collets 203a, 203b, the anti-side loading piston used in the connector 10 is not needed in the connector 200.

The remaining construction and operation of the connector 200 is generally similar to the connector 10 in that it includes a rear body 210, a sleeve 212, a sealing piston 214, a shaft 216, and a coil spring 218 with a large spring force between the sealing piston 214 and the shaft 216 that biases the sealing piston and the shaft in opposite directions. The specific construction of the front body 206, the rear body 210, the sleeve 212, the sealing piston 214, the shaft 216, the coil spring 218 and the remaining components is apparent from FIGS. 8-14, and the operation of these components is generally similar to the operation of corresponding components described with respect to the connector 10 in FIGS. 1-7. It is noted that the shaft 216 is connected to the rear body 210 via threads 220

Figure 9:
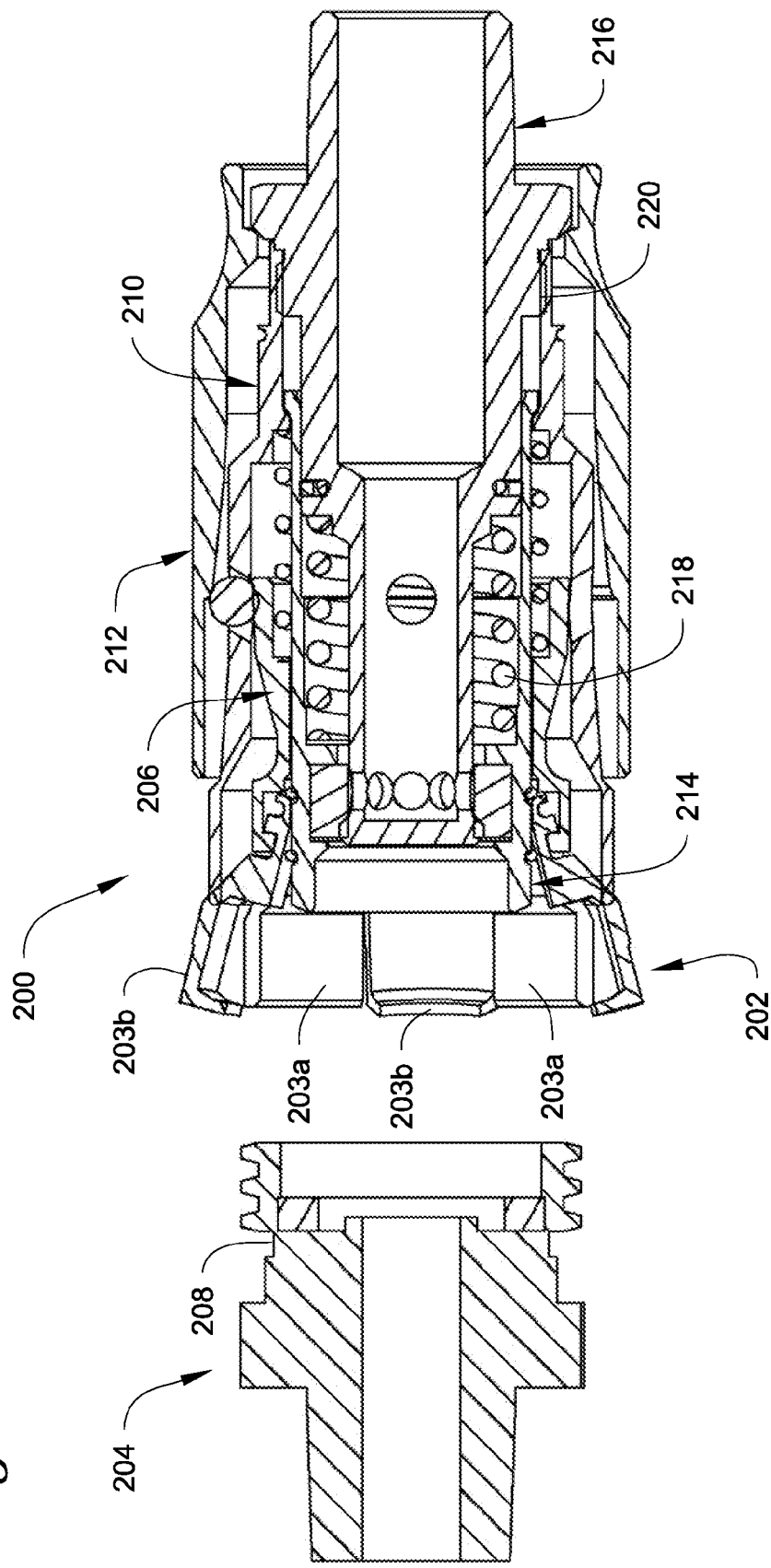

FIG. 9 illustrates a default stage of the connector 200 when the connector is not connected to the fitting. FIG. 10 illustrates a preliminary stage of the connector 200 when it is first connected to the fitting 204. FIG. 11 illustrates the connector 200 at the beginning of actuation to achieve connection. FIG. 12 illustrates the connector at an intermediate stage of connection. FIG. 13 illustrates the connector 200 at the full connected stage. FIG. 14 illustrates operation of the connector 200 without engagement with the fitting 204.

FIGS. 15-19 illustrate an alternative embodiment of a connector 300 that incorporates many of the concepts of the connectors 10, 200. The differences in the connector 300 from the connectors 10, 200 will be described, it being understood that the undescribed features in the connector 300 are generally similar, at least in function, to corresponding features in the connectors 10, 200.

The connector 300 is designed to engage with a fitting 302 and open a valve 304 in the fitting. The valve 304 is normally closed to prevent fluid flow through the fitting 302, but is actuated open by a push rod 306 connected to the end of a shaft 308 of the connector 300. The rod 306 moves forward as the shaft 308 moves forward during connection to the fitting 302.

Figure 16:
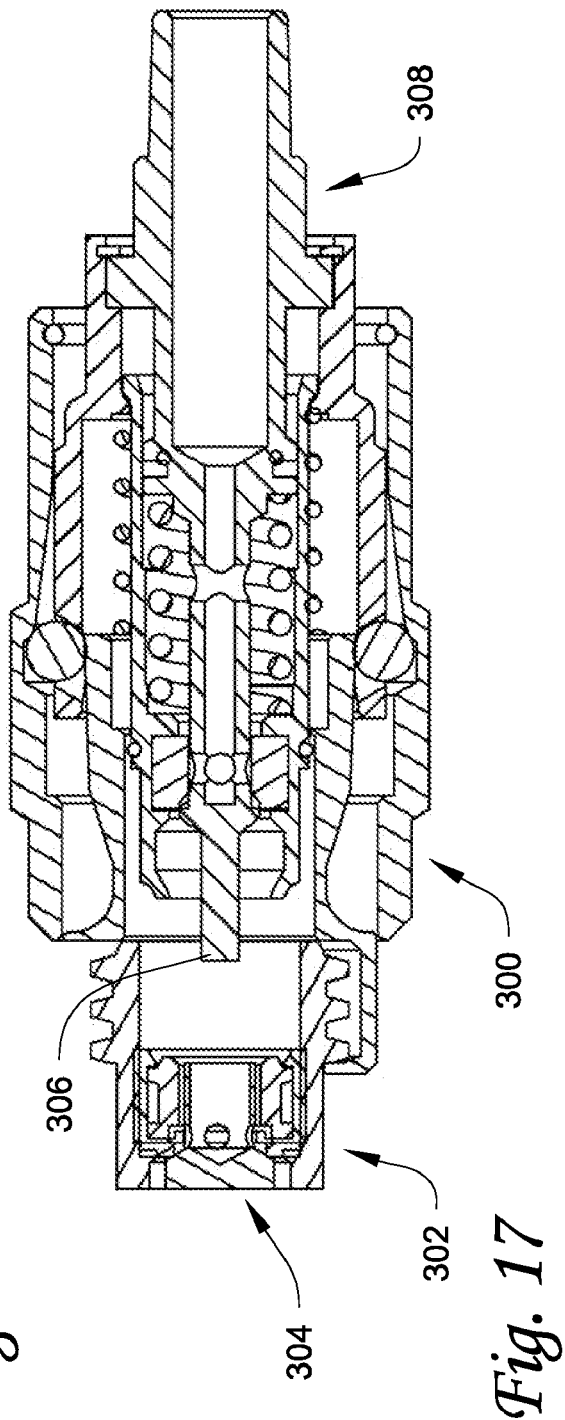
Figure 17:
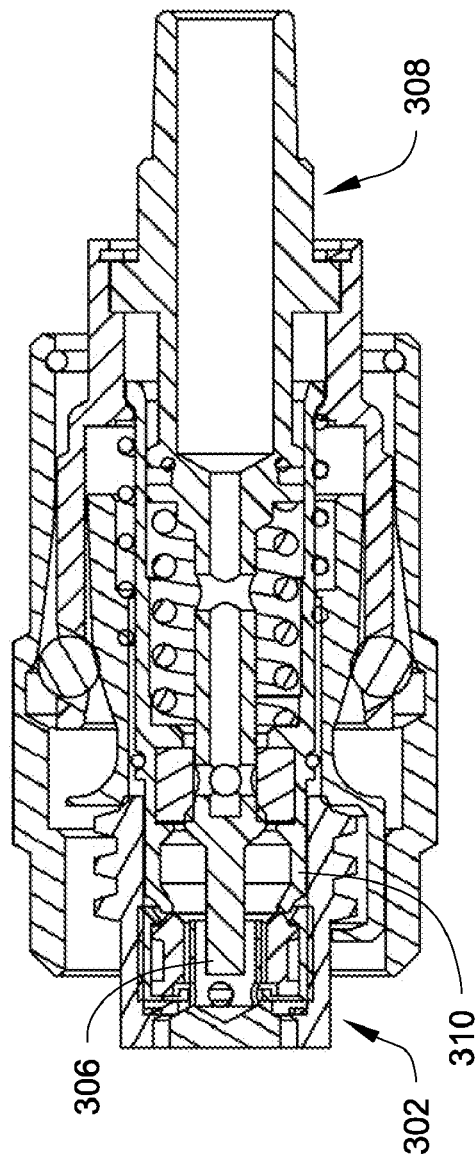
Figure 18:
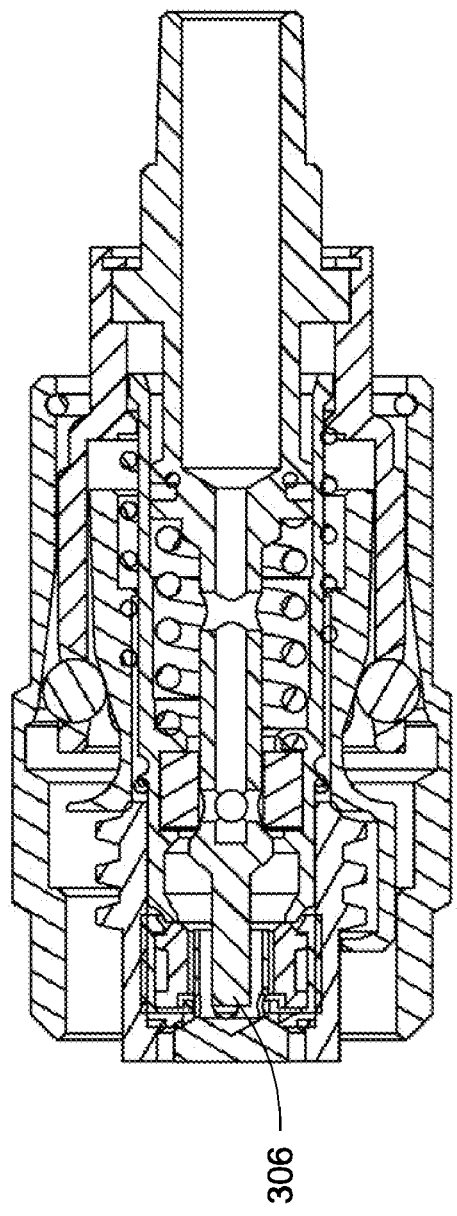
Figure 19:
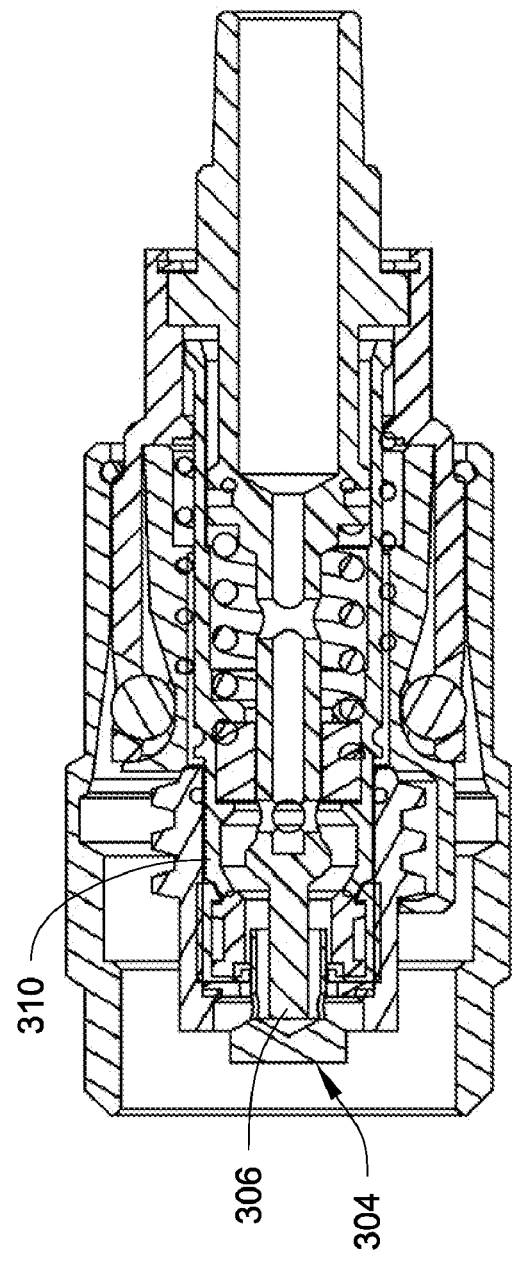

When the connection mechanism of the connector 300 is first hooked to the fitting 302, as shown in FIG. 16, and at the beginning of actuation to achieve connection as shown in FIG. 17, the end of the push rod 306 is spaced from the valve 304. At an intermediate stage of connection shown in FIG. 18, the end of the push rod 306 is still spaced from, but is near the start of contacting, the valve 304. At the full connected stage shown in FIG. 19, the push rod 306 has moved forwardly enough to open the valve 304, allowing fluid to flow through the connector 300 and the fitting 302.

With reference to FIG. 17, the sealing piston 310 has an exterior diameter that is slightly less than the inner diameter of the bore of the fitting 302. Due to the close fit between the sealing piston 310 and the fitting bore, side loading is limited. However, an anti-side load piston similar in location, configuration and function to the anti-side load piston 130 illustrated and described with respect to FIGS. 1-7 could be incorporated into the connector 300 as well.

As with the connectors 10, 200, if the connector 300 is activated without engagement with the fitting 302, the shaft 308 remains in sealing engagement with the main seal to prevent fluid flow through the connector 300.

The invention claimed is:

1. A connector for connecting a first fluid system to a second fluid system, comprising:
    a front body that includes a connection mechanism configured to connect the connector with the second fluid system, and a circumferential actuating ramp that is angled relative to a longitudinal axis of the connector;
    a rear body having a portion disposed around the front body, and the portion including a plurality of holes with an actuating ball disposed in each hole, the actuating balls being engageable with the actuating ramp;
    a sleeve disposed around the front body and the rear body, the sleeve being engageable with the actuating balls;
    a sealing piston disposed within the front body and the rear body and including a forward end engageable with the second fluid system;
    a shaft disposed within the sealing piston, the shaft is fixed to the rear body; and
    a spring engaged between the sealing piston and the shaft and generating a biasing force that biases the sealing piston and the shaft in opposite directions.

2. The connector of claim 1, wherein the connection mechanism comprises collets.

3. The connector of claim 1, wherein the connection mechanism comprises a semi-cylindrical nest.

4. The connector of claim 1, wherein the connector includes a connected stage where the connection mechanism is connected to an end portion of the second fluid system, the forward end of the sealing piston is disposed within an interior diameter of the end portion of the second fluid system and contacts a seal on the end portion, and the sleeve is disposed around the connection mechanism and around an exterior diameter of the end portion.

5. The connector of claim 1, wherein the sealing piston includes an interior surface, and a seal is disposed on the interior surface; the shaft includes an outer wall, a flow passage defined by the wall, a sealing shoulder configured to engage with the seal, and a plurality of openings through the outer wall leading to the flow passage; and the length of the seal measured parallel to the longitudinal axis is greater than the length of the openings measured parallel to the longitudinal axis.

6. The connector of claim 1, further comprising a push rod connected to the shaft.

7. A connector for connecting a first fluid system to a second fluid system, comprising:
    a front body that includes a connection mechanism configured to connect the connector with the second fluid system;
    a rear body having a portion disposed around the front body, the rear body and the front body being movable relative to each other in a direction parallel to a longitudinal axis of the connector;
    an actuating sleeve disposed around the front body and the rear body;
    a mechanical advantage mechanism engaged between the actuating sleeve, the front body and the rear body;
    a sealing piston disposed within the front body and the rear body and including a forward end engageable with the second fluid system;
    an anti-side load piston disposed between an outer surface of the sealing piston and an interior surface of the front body
    a shaft disposed within the sealing piston, the shaft is fixed to the rear body; and
    a spring engaged between the sealing piston and the shaft and generating a biasing force that biases the sealing piston and the shaft in opposite directions.

8. The connector of claim 7, wherein the anti-side load piston includes a wedge-shaped forward end that is configured to wedge into a bore of the second fluid system.

9. The connector of claim 7, further comprising a push rod connected to the shaft.

10. A connector for connecting a first fluid system to a second fluid system, comprising:
    a front body that includes a connection mechanism configured to connect the connector with the second fluid system;
    a rear body having a portion disposed around the front body, the rear body and the front body being movable relative to each other in a direction parallel to a longitudinal axis of the connector;
    a sleeve disposed around the front body and the rear body and being movable relative to the front body and the rear body in a direction parallel to the longitudinal axis;
    a sealing piston disposed within the front body and the rear body and being actuatable in a direction parallel to the longitudinal axis, the sealing piston including a forward end;
    a shaft disposed within the sealing piston, the shaft is fixed to the rear body; and
    a spring engaged between the sealing piston and the shaft and generating a biasing force that biases the sealing piston and the shaft in opposite directions;
    wherein the connector includes a connected stage where the connection mechanism is connected to an end portion of the second fluid system, the forward end of the sealing piston is disposed within an interior diameter of the end portion and contacts a seal on the end portion, and the sleeve is disposed around the connection mechanism and around an exterior diameter of the end portion.

11. The connector of claim 10, wherein the connection mechanism comprises collets.

12. The connector of claim 10, wherein the connection mechanism comprises a semi-cylindrical nest.

13. The connector of claim 10, wherein the sealing piston includes an interior surface, and a seal is disposed on the interior surface; the shaft includes an outer wall, a flow passage defined by the wall, a sealing shoulder configured to engage with the seal, and a plurality of openings through the outer wall leading to the flow passage; and the length of the seal measured parallel to the longitudinal axis is greater than the length of the openings measured parallel to the longitudinal axis.

14. The connector of claim 10, further comprising a mechanical advantage mechanism engaged between the sleeve, the front body and the rear body to provide a mechanical advantage to overcome the biasing force of the spring.

15. The connector of claim 10, further comprising an antiside load piston disposed between an outer surface of the sealing piston and an interior surface of the front body.

16. The connector of claim 10, further comprising a push rod connected to the shaft.

17. A connector for connecting a first fluid system to a second fluid system, comprising:
- a front body that includes a connection mechanism configured to connect the connector with the second fluid system;
- a rear body having a portion disposed around the front body;
- a sleeve disposed around the front body and the rear body and being movable in a direction parallel to a longitudinal axis of the connector;
- a sealing piston disposed within the front body and the rear body, the sealing piston including an interior surface;
- a seal disposed on the interior surface of the sealing piston;
- a shaft disposed within the sealing piston, the shaft is fixed to the rear body, and the shaft includes an outer wall, a flow passage defined by the wall, a sealing shoulder configured to engage with the seal, and a plurality of openings through the outer wall leading to the flow passage, and the length of the seal measured parallel to the longitudinal axis is greater than the length of the openings measured parallel to the longitudinal axis; and
- a spring engaged between the sealing piston and the shaft and generating a biasing force that biases the sealing piston and the valve piston in opposite directions.

18. The connector of claim 17, wherein the connection mechanism comprises collets.

19. The connector of claim 17, wherein the connection mechanism comprises a semi-cylindrical nest.

20. The connector of claim 17, wherein the connector includes a connected stage where the connection mechanism is connected to an end portion of the second fluid system, the sealing piston is disposed within an interior diameter of the end portion and contacts a seal at the end portion, and the sleeve is disposed around the connection mechanism and around an exterior diameter of the end portion.

21. The connector of claim 17, further comprising a mechanical advantage mechanism engaged between the sleeve, the front body and the rear body to provide a mechanical advantage to overcome the biasing force of the spring.

22. The connector of claim 17, further comprising an antiside load piston disposed between an outer surface of the sealing piston and an interior surface of the front body.

23. The connector of claim 17, further comprising a push rod connected to the shaft.

\* \* \* \* \*